United States Patent
Sugimoto

(10) Patent No.: US 8,073,319 B2
(45) Date of Patent: Dec. 6, 2011

(54) PHOTOGRAPHING METHOD AND PHOTOGRAPHING APPARATUS BASED ON FACE DETECTION AND PHOTOGRAPHY CONDITIONS

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 569 days.

(21) Appl. No.: 11/727,328

(22) Filed: Mar. 26, 2007

(65) Prior Publication Data

US 2007/0223912 A1    Sep. 27, 2007

(30) Foreign Application Priority Data

Mar. 27, 2006  (JP) .................... 2006-085460

(51) Int. Cl.
*G03B 13/00*  (2006.01)
*G03B 13/34*  (2006.01)
*G03B 3/10*   (2006.01)
*G03B 3/00*   (2006.01)

(52) U.S. Cl. ....................... 396/123; 396/124

(58) Field of Classification Search ........... 396/123–124
See application file for complete search history.

(56) References Cited

U.S. PATENT DOCUMENTS

| | | | |
|---|---|---|---|
| 6,859,618 B1 * | 2/2005 | Yip ................................ | 396/61 |
| 7,248,721 B2 | 7/2007 | Sato et al. | |
| 7,298,412 B2 * | 11/2007 | Sannoh et al. ................ | 348/348 |
| 7,379,099 B2 * | 5/2008 | Amano ....................... | 348/222.1 |
| 2004/0119852 A1 * | 6/2004 | Shin .......................... | 348/240.2 |
| 2004/0174434 A1 * | 9/2004 | Walker et al. .............. | 348/211.3 |
| 2006/0182433 A1 * | 8/2006 | Kawahara et al. .......... | 396/123 |
| 2009/0135269 A1 * | 5/2009 | Nozaki et al. ............. | 348/222.1 |

FOREIGN PATENT DOCUMENTS

| | | |
|---|---|---|
| JP | 2003-296711 | 10/2003 |
| JP | 2004-118131 A | 4/2004 |
| JP | 2004-320286 A | 11/2004 |
| JP | 2005-223659 A | 8/2005 |

* cited by examiner

*Primary Examiner* — Clayton E LaBalle
*Assistant Examiner* — Bret Adams
(74) *Attorney, Agent, or Firm* — Birch, Stewart, Kolasch & Birch, LLP

(57) ABSTRACT

Frequency of unnecessary face detection operations performed in a photographing apparatus is reduced, thereby reducing the power consumption by the face detection operations. A determining unit determines whether or not a photographing condition of the photographing apparatus satisfies a precondition for efficiently using a result of detection by a detecting unit, which detects an image representing a face from images taken through the imaging lens of the photographing apparatus. A controlling unit exerts control such that, if it is determined that the photographing condition of the photographing apparatus satisfies the precondition, the detecting unit carries out the detection, and if it is determined that the photographing condition of the photographing apparatus does not satisfy the precondition, the detecting unit does not carry out the detection.

5 Claims, 6 Drawing Sheets

PHOTOGRAPHING METHOD AND PHOTOGRAPHING APPARATUS BASED ON FACE DETECTION AND PHOTOGRAPHY CONDITIONS

BACKGROUND OF THE INVENTION

1. Field of the Invention

The present invention relates to a photographing method and a photographing apparatus, which take a subject's image focused on an imaging surface through an imaging lens.

2. Description of the Related Art

Digital cameras, which detect an image representing a human face from taken images to automatically focus on the subject's face or to automatically change the zoom magnification so that the area representing the face in the detected image is enlarged, have been known (see Japanese Unexamined Patent Publication No. 2004-320286).

For use with such digital cameras, a method for automatically focusing on a subject's face, in which images for photographing conditions setting are taken when the shutter button is half pressed, and an image representing the face is detected from the images to focus on the face, has been known.

A digital camera using a "continuous face detection method" has been known. In the continuous face detection method, face detection for detecting an image representing a face from images taken for monitoring is constantly carried out even when the shutter button is not touched. Then, when a face is detected, the face is automatically focused. According to this method, the digital camera can be operated so that the face detection is always carried out and the detected subject's face is focused regardless of the operational state of the shutter button. Therefore, the display monitor can display images taken with the subject's face being always focused on, and photographing for recording an image (hereinafter may be referred to as "actual photographing") can be carried out with no waiting time.

Further as a mechanism for focusing on the face, an AF (automatic focus) mechanism using a contrast detection method has been known. In the contrast detection AF mechanism, images are taken while the focusing lens group is moved within its operation range, and the image having the maximum contrast, i.e., having the maximum focus evaluation value, is found from the images. Then, the focusing lens group is set at the position where the image with the maximum contrast has obtained (see Japanese Unexamined Patent Publication No. 2004-320286).

Since a large amount of image processing is carried out in the above-described face detection operation, power consumption by the face detection operation is also large in proportion to the amount of processing. Frequent use of the face detection will result in early depletion of the battery power for driving the digital camera. Therefore, there are demands for reduction of power consumption by the face detection operation.

The face detected in the face detection operation is photographed (actual photographing) and recorded in a memory or the like. Thus recorded images may include unnecessary images containing a blurred face(s) due to, for example, movement of the hand holding the camera. Therefore, there are also demands for avoiding the face detection under conditions where unnecessary images will be photographed even with use of the face detection function, that is, under conditions where the face detection function is not efficiently used.

SUMMARY OF THE INVENTION

In view of the above-described circumstances, the present invention is directed to provide a photographing method and a photographing apparatus that allow avoidance of unnecessary face detection operation, thereby reducing the power consumption by the face detection operations.

An aspect of the photographing apparatus of the invention is a photographing apparatus for photographing an image of a subject focused on an imaging surface through an imaging lens. The photographing apparatus includes: a discrimination information storing means for storing discrimination information for discriminating a face; a detecting means for detecting, based on the discrimination information, an image representing a face from images taken through the imaging lens; a precondition storing means for storing preconditions for efficiently using the result of the detection by the detecting means; a determining means for determining whether or not a photographing condition of the photographing apparatus satisfies the precondition; and a controlling means for exerting control such that, if it is determined by the determining means that the photographing condition of the photographing apparatus satisfies the precondition, the detecting means carries out the detection, and if it is determined that the photographing condition of the photographing apparatus does not satisfy the precondition, the detecting means does not carry out the detection.

The face may be a human face.

The precondition may be a backlit state where an amount of light received in a peripheral area of the imaging surface is larger than an amount of light received in a central area of the imaging surface. The amount of light received in the central area of the imaging surface is an average amount of received light per unit area in an area containing the weighted center of the light receiving area on the imaging surface, which is not more than 30% of the entire area of the imaging surface. The amount of light received in the peripheral area of the imaging surface is an average amount of received light per unit area in an area other than the central area of the imaging surface, which is less than 70% of the entire area of the imaging surface.

The precondition may be that the angle of view of the imaging lens is fixed. It should be noted that the condition where the angle of view is fixed is not limited to a state where the angle of view is completely fixed, and includes a state where changes in the angle of view are small enough that no blur is observed in the image representing a face acquired by photographing the face.

The precondition may be that the photographing apparatus is stationary. It should be noted that the condition where the photographing apparatus is stationary is not limited to a state where the photographing apparatus is completely stationary, and includes a state where changes in the position of the photographing apparatus are small enough that no blur is observed in the image representing a face acquired by photographing the face.

The precondition may be that an amount of light received on the imaging surface stays unchanged. It should be noted that the amount of received light refers to an amount of received light per unit area on the imaging surface. The precondition "an amount of light received on the imaging surface stays unchanged" means that changes in the amount of light received in a partial area or the entire area of the imaging surface is within a range of ±5%.

The area from which the amount of received light is obtained may, for example, be the entire imaging surface, an area of interest on the imaging surface, or sectional areas of the imaging surface.

The photographing apparatus may include an automatic focusing means for carrying out continuous AF for always setting the point of focus of the imaging lens at a position of the subject, and the precondition may be that the automatic focusing means carrying out the continuous AF maintains the point of focus of the imaging lens unchanged.

It should be noted that the continuous AF is an automatic focusing method in which the point of focus is always adjusted to focus on the subject, without user's manipulation of the shutter button.

The precondition may be that values representing colors of the taken images stay unchanged. It should be noted that the condition where values representing colors of the taken images stay unchanged is not limited to a state where the values representing colors do not change at all, and includes a state where changes in the values representing colors are small enough that no defect is observed when photographing the face. The value representing colors of each taken image may, for example, be an integration value of the R, G and B signals representing the colors of the image. Alternatively, the value representing colors of the image may be a white balance value. Further, the area from which the value representing colors of the image is obtained may be the entire imaging surface, an area of interest on the imaging surface, or sectional areas of the imaging surface.

The photographing apparatus may further include a subject movement detecting means for detecting movement of the subject and outputting the result of the detection, and the precondition may be that the output from the subject movement detecting means indicates that the position of the subject stays unchanged.

The precondition may be that a photographing mode of the photographing apparatus is set to one of a face detection mode, a person photographing mode, a self-timer photographing mode and a self-photographing mode. It should be noted that the person photographing mode is a photographing mode assuming that the subject is a person(s).

The precondition may be that an amount of remaining energy accumulated in a battery for driving the automatic focusing means is not more than a preset threshold value. The precondition may be that an amount of remaining energy accumulated in a battery for driving the automatic focusing means is not less than a preset threshold value. The threshold value may be 10% of the maximum amount of energy that can be accumulated in the battery.

The precondition may be that an amount of light received on the imaging surface is changing.

The photographing apparatus may further include an automatic focusing means for carrying out continuous AF for always setting the point of focus of the imaging lens at a position of the subject, and the precondition may be that the automatic focusing means carrying out the continuous AF is changing the point of focus of the imaging lens.

The precondition may be that values representing colors of the taken images are changing.

The photographing apparatus may further include a subject movement detecting means for detecting movement of the subject and outputting the result of the detection, and the precondition may be that the output from the subject movement detecting means indicates that the position of the subject is changing.

The precondition storing means may store different candidate preconditions being candidates for the precondition, and the photographing apparatus may further include a selecting means for selecting at least one of the candidate preconditions to be used in the determination. The number of the precondition used in the determination is not limited to one, and a combination of two or more preconditions may be used.

The precondition storing means may store preconditions such as "a backlit state where an amount of light received in a peripheral area of the imaging surface is larger than an amount of light received in a central area of the imaging surface", "the angle of view of the imaging lens is fixed", "the photographing apparatus is stationary" and "an amount of light received on the imaging surface stays unchanged".

An aspect of the of the photographing method of the invention is a photographing method for photographing an image of a subject focused on an imaging surface through an imaging lens. The method includes: determining whether or not a photographing condition at the time to carry out the photographing satisfies a precondition for efficiently using a result of detection of an image representing a face from images taken through the imaging lens; and controlling such that, if it is determined that the photographing condition at the time to carry out the photographing satisfies the precondition, the detection is carried out, and if it is determined that the photographing condition at the time to carry out the photographing does not satisfy the precondition, the detection is not carried out.

DESCRIPTION OF THE PREFERRED EMBODIMENTS

Hereinafter, an embodiment of the present invention will be described in detail with reference to the drawings.

Figure 1:
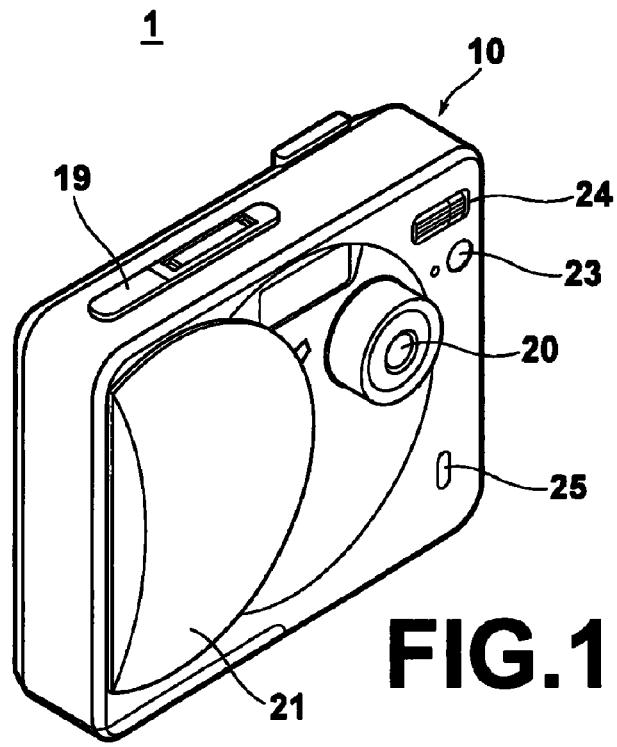
FIG. 1 is a front view of an appearance of a digital camera, which is a photographing apparatus according to an embodiment of the present invention.
Figure 2:
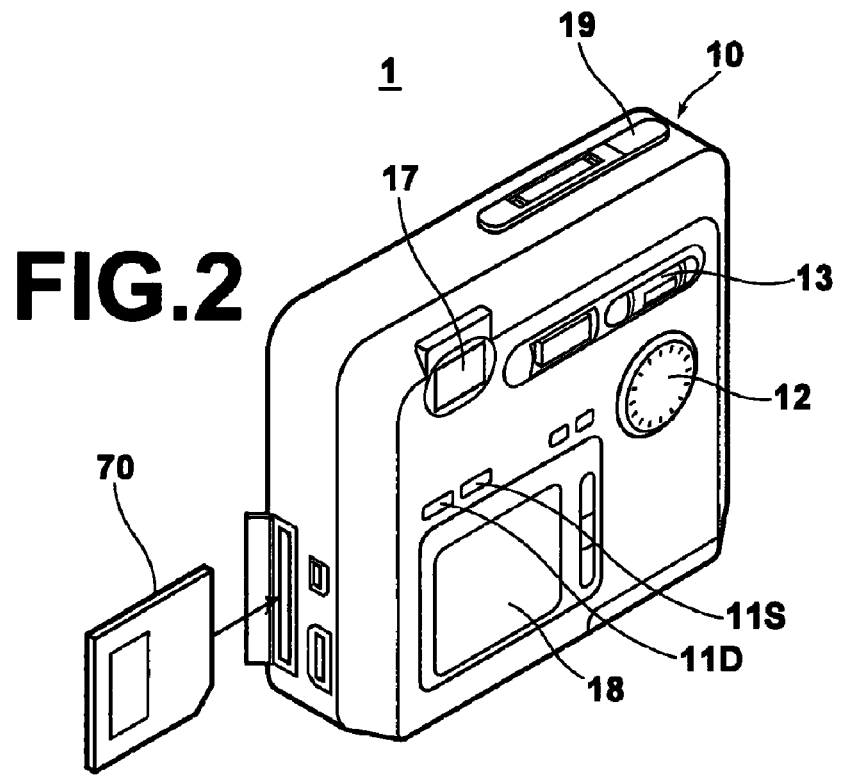
FIG. 2 is a rear view of the appearance of the digital camera, which is the photographing apparatus according to the embodiment of the invention.
Figure 3:
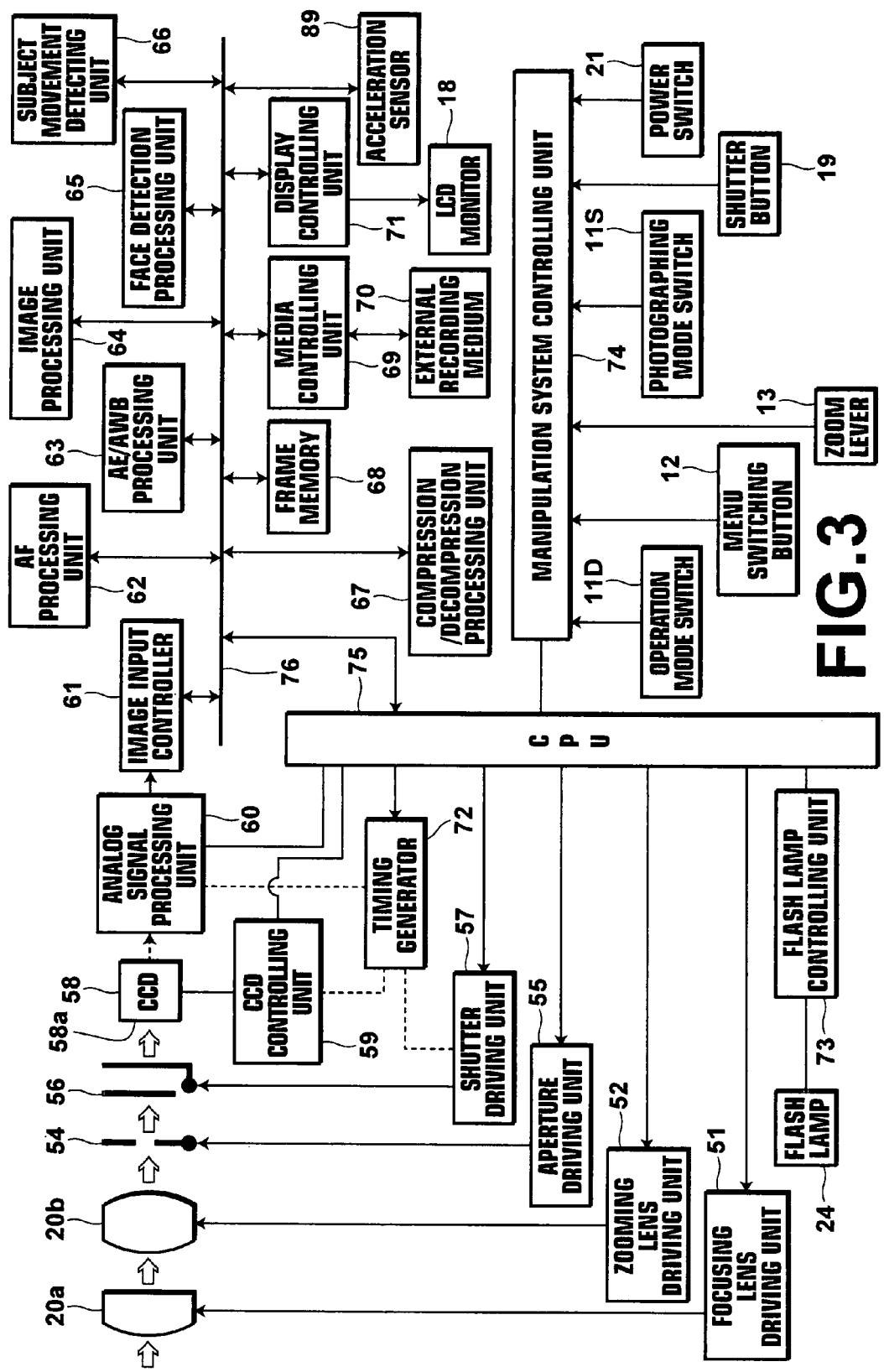
FIG. 3 is a block diagram illustrating the electrical configuration of the digital camera.
Figure 4:
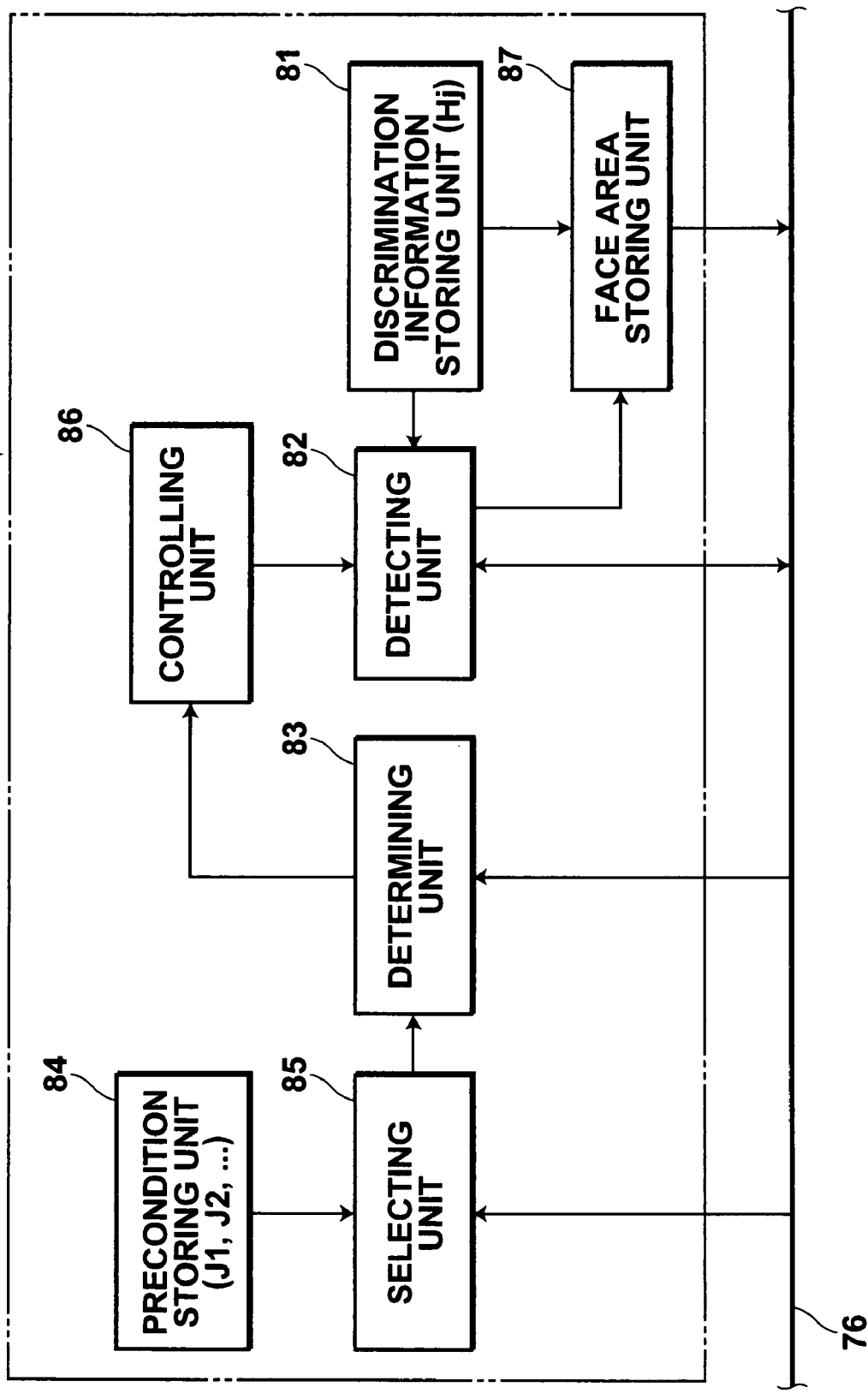
FIG. 4 is a block diagram illustrating the detailed configuration of a face detection processing unit in the block diagram of FIG. 3.
Figure 5:
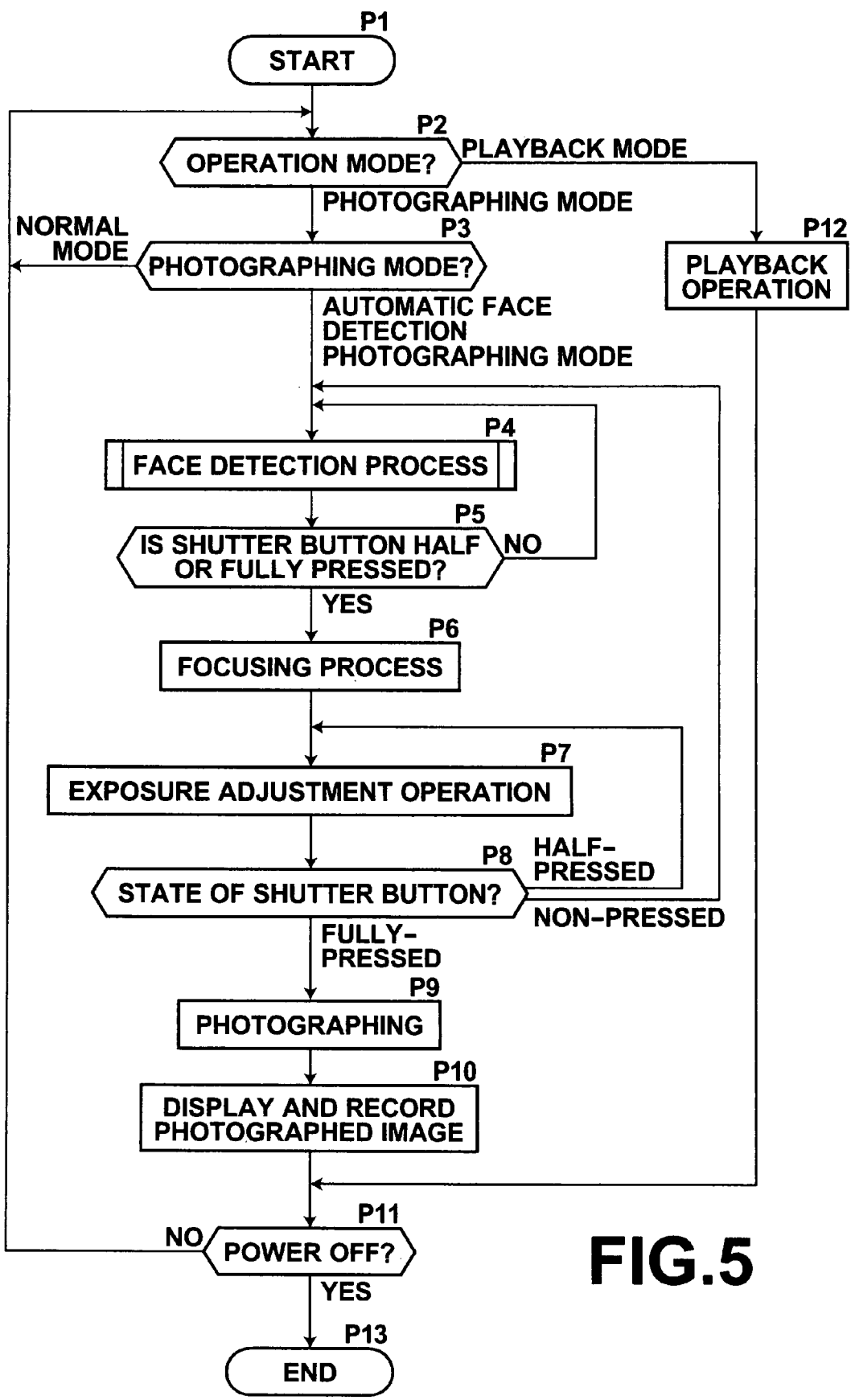
FIG. 5 is a flow chart illustrating the flow of an overall photographing process of the digital camera.

FIGS. 1 and 2 show a digital still camera (hereinafter simply referred to as a "digital camera"), which is one example of a photographing apparatus carrying out a photographing method according to the embodiment of the present invention. FIG. 1 is a front view of the digital still camera, and FIG. 2 is a rear view of the digital still camera. FIG. 3 is a block diagram mainly showing the electrical configuration of the digital camera, FIG. 4 is a block diagram showing details of a face detection processing unit in the above block diagram, and FIG. 5 is a flow chart showing the flow of the overall process carried out in the digital camera.

The digital camera 1 includes an imaging lens 20. A subject's image is focused through the imaging lens 20 on an imaging surface 58a, which is a photoelectric conversion surface of a CCD 58, to be photographed. As shown in FIG. 4 for example, the digital camera 1 includes a discrimination information storing unit 81 for storing discrimination information Hj for discriminating a face, a detecting unit 82 for detecting an image representing a face from images taken through the imaging lens 20 based on the discrimination information Hj, a precondition storing unit 84 for storing preconditions for efficiently using the detection by the detecting unit 82, a determining unit 83 for determining whether or not a photographing condition of the digital camera 1 satisfies the precondition, and a controlling unit 86d that exerts control such that if it is determined by the determining unit 83 that the photographing condition of the digital camera 1 satisfies the precondition, the detecting unit 82 carries out the detection, and if it is determined that photographing condition of the digital camera 1 does not satisfy the precondition, the detecting unit 82 does not carry out the detection.

The precondition storing unit 84 stores different preconditions, which are candidates for the precondition, and the selecting unit 85 selects at least one of the candidate preconditions to be used for the determination.

The discrimination information storing unit 81, the detecting unit 82, the determining unit 83, the precondition storing unit 84, the selecting unit 85, the controlling unit 86, and the like, form a face detection processing unit 65.

The digital camera 1 will be described in more detail below.

As shown in FIG. 2, an operation mode switch 11D, a photographing mode switch 11S, a menu switching button 12 and a zoom lever 13, which serve as an interface for user's manipulation, are provided on the rear side of a body 10 of the digital camera 1. Further, buttons such as a display cursor moving button, a display returning button and a display switching button (which are not shown) are also provided as the interface.

The rear side of the body 10 is further provided with a finder 17 for viewing the subject, a LCD (liquid crystal display) monitor 18 for displaying photographed and played back images, and the like. Furthermore, a shutter button 19 is provided on the top side of the body 10.

As shown in FIG. 1, the front side of the body 10 includes an imaging lens 20, a lens cover 21 that slides in the transverse direction and also serves as a power switch, a finder window 23, a flash lamp 24 and a self-timer lamp 25.

The operation mode switch 11D is a slide switch for switching between operation modes, i.e., a photographing mode and a playback mode, of the digital camera 1. The menu switching button 12 is a button to be pressed or rotated to display, on the LCD monitor 18, various menus for advanced settings of the photographing modes, advanced settings of a light flashing mode, settings of the number of pixels to be recorded and sensitivity, and to provide selection or setting based on the menu displayed on the LCD monitor 18.

The zoom lever 13 is moved up or down to change the focal length of the imaging lens toward the telephoto side or the wide-angle side.

The display cursor moving button is used for moving a cursor in the menu screen displayed on the LCD monitor 18 for various settings, and the display returning button is used to terminate a current setting operation and return the menu screen to a previous screen. The display switching button is used to switch between ON and OFF of the LCD monitor 18, ON and OFF of various guidance screens, ON and OFF of text display, and the like.

Contents of settings made through manipulation of the respective buttons and the lever described above can be visually confirmed, for example, by the display on the LCD monitor 18, by the lamp in the finder and/or by the position of the slide lever. The LCD monitor 18 serves as an electronic view finder by displaying a live view (described later) for viewing the subject during photographing. The LCD monitor 18 also displays a playback view of photographed still images or motion images, as well as various setting menus.

The live view is an image taken at a predetermined time interval and displayed on the LCD monitor 18 without the shutter button being pressed while the photographing mode is selected. The number of pixels forming an image that is taken as the live view is about $\frac{1}{16}$ of the number of pixels forming the actually photographed image. The actually photographed image is an image to be recorded, which is acquired when the shutter button is fully pressed to carry out actual photographing. The image data representing the actually photographed image is recorded in an external recording medium 70. The live view and images taken as preliminary images (described later) are not recorded.

As shown in FIGS. 2 and 3, the digital camera 1 converts the image data of the photographed image into an image file of, for example, Exif format, and records the image file in the external recording medium 70 that is attachable to and removable from the body of the digital camera 1. The image file stores image data and associated information.

The digital camera 1 includes a manipulation system controlling unit 74 that serves as an interface for communication between a CPU (central processing unit) 75 and the user who manipulates the switches, such as the operation mode switch 11D, the photographing mode switch 11S, the menu switching button 12, the zoom lever 13, the shutter button 19 and the lens cover 21 that also serves as the power switch, as well as other switches such as the display cursor moving button, the display returning button and the display switching button.

Further, a focusing lens group 20a and a zooming lens group 20b, which form the imaging lens 20, are provided. These lens groups are respectively driven by a focusing lens driving unit 51 and a zooming lens driving unit 52, each of which is formed by a motor and a motor driver, to be moved along the optical axis. The focusing lens driving unit 51 moves the focusing lens group 20a based on focusing lens driving amount data outputted from an AF processing unit 62. The zooming lens driving unit 52 moves the zooming lens group 20b based on data representing an amount of manipulation of the zoom lever 13.

The digital camera 1 includes an automatic focusing unit for adjusting the point of focus of the imaging lens 20 to focus on the subject. The automatic focusing unit is formed by the focusing lens group 20a, the focusing lens driving unit 51, the AF processing unit 62, the CPU 75, and the like.

The point of focus herein refers to a position of the subject (object point) corresponding to an image (image point) correctly focused on the imaging surface. The image of the subject positioned at the point of focus of the imaging lens is focused on the imaging surface.

An aperture 54 is driven by an aperture driving unit 55 formed by a motor and a motor driver. The aperture driving unit 55 controls the aperture diameter based on aperture value data outputted from an AE (automatic exposure)/AWB (automatic white balance) processing unit 63.

A shutter 56 is a mechanical shutter, which is driven by a shutter driving unit 57 formed by a motor and a motor driver. The shutter driving unit 57 controls opening and closing of the shutter 56 according to a signal generated when the shutter button 19 is pressed and shutter speed data outputted from the AE/AWB processing unit 63.

The CCD 58, which is an image pickup device, is disposed downstream the optical system formed by the focusing lens group 20a, the zooming lens group 20b, the aperture 54, the shutter 56, and the like. The CCD 58 includes an imaging surface 58a formed by a two-dimensional array of a large number of light receiving elements. The light of the subject passing through the optical system is focused onto the imaging surface 58a and subjected to photoelectric conversion. A micro lens array (not shown) for converging the light at each pixel on the imaging surface 58a and a color filter array (not shown) formed by regularly arrayed R, G and B color filters are disposed upstream the imaging surface 58*a*. The CCD 58 outputs electric charges accumulated at the respective pixels of each line as a serial analog image signal synchronously with a vertical transfer clock and a horizontal transfer clock supplied from a CCD controlling unit 59. A time for accumulating the charges at the pixels, i.e., an exposure time, is determined by an electronic shutter driving signal supplied from the CCD controlling unit 59.

The analog image signal outputted from the CCD 58 is inputted to an analog signal processing unit 60. The analog signal processing unit 60 includes a correlation double sampling circuit (CDS) for removing noise from the analog signal, an automatic gain controller (AGC) for controlling a gain of the analog signal, and an A/D converter (ADC) for converting the analog signal into a digital signal. The image data converted into the digital signal is CCD-RAW data which includes R, G and B density values at the individual pixels.

The timing generator 72 generates a timing signal. The timing signal is inputted to the shutter driving unit 57, the CCD controlling unit 59 and the analog signal processing unit 60, thereby synchronizing the manipulation of the shutter button 19 with opening/closing of the shutter 56, transfer of the electric charges of the CCD 58 and processing by the analog signal processing unit 60. A flash lamp controlling unit 73 controls flashing of the flash lamp 24.

An image input controller 61 writes the image data (CCD-RAW data) inputted from the analog signal processing unit 60 in a frame memory 68. The frame memory 68 provides a workspace for various digital image processing (signal processing) applied to the image data, which will be described later. The frame memory 68 is formed, for example, by a SDRAM (Synchronous Dynamic Random Access Memory) that transfers data synchronously with a bus clock signal of a constant frequency.

A display controlling unit 71 causes, for example, the image data stored in the frame memory 68 to be displayed on the LCD monitor 18 as the live view. The display controlling unit 71 converts the image data into a composite signal by combining the luminance (Y) signal and the chromatic (C) signals and outputs the composite signal to the LCD monitor 18.

The AF processing unit 62 and the AE/AWB processing unit 63 determine a photographing condition based on preliminary images. The preliminary images are images acquired for setting a photographing condition. For example, when the shutter button 19 is half pressed, a half-pressed state signal is generated. The half-pressed state signal is detected by the CPU 75, and the CPU 75 causes the CCD 58 to take images of the subject. The data of the images taken at this time is stored in the frame memory 68. It should be noted that the number of pixels forming the preliminary image is the same as the number of pixels forming the live view.

The AF processing unit 62 detects the position of the subject based on the preliminary images or the live view, and then, outputs the focusing lens driving amount data.

In this embodiment, a passive method is used for detecting the position of the subject. The passive method utilizes the fact that a focused subject in a photographed image has a higher contrast than an unfocused subject. This point will be described in more detail later.

The AE/AWB processing unit 63 measures a brightness of the subject based on the preliminary images, and then determines an aperture value, a shutter speed, and the like, to output the determined aperture value data and shutter speed data (AE), and automatically controls the white balance for photographing the subject (AWB).

The image processing unit 64 applies, to the image data of the actually photographed image that has been acquired by actual photographing, image quality correction processing, such as gamma correction, sharpness correction and contrast correction, and YC processing to convert the CCD-RAW data into YC data formed by Y data representing a luminance signal, Cb data representing a blue color-difference signal and Cr data representing a red color-difference signal.

The actually photographed image is an image taken via the CCD 58 by actual photographing that is carried out when the shutter button 19 is fully pressed. The image data of the actually photographed image is stored in the frame memory via the analog signal processing unit 60 and the image input controller 61. The upper limit for the number of pixels forming the actually photographed image is determined by the number of pixels of the CCD 58. The number of pixels of an image to be recorded can be changed by setting, such as fine or normal. On the other hand, the number of pixels forming the live view or the preliminary image is less than the number of pixels forming the actually photographed image. The number of pixels forming the live view or the preliminary image is, for example, about $\frac{1}{16}$ of the number of pixels forming the actually photographed image.

A compression/decompression processing unit 67 applies compression processing according to a certain compression format, such as JPEG, to the data of the actually photographed image that has been subjected to the correction and conversion processing by the image processing unit 64, to generate an image file. The image file is associated with a tag that stores associated information based, for example, on the Exif format. In the playback mode, the compression/decompression processing unit 67 reads out the compressed image file from the external recording medium 70, and applies decompression processing to the image file. The decompressed image data is outputted to the LCD monitor 18.

A media controlling unit 69 accesses to the external recording medium 70 and controls writing or reading of the image file.

The CPU 75 control the components on/in the body of the digital camera 1 according to signals from the manipulation system such as the operation mode switch 11D and the various processing units such as the AF processing unit 62. A data bus 76 is connected to the image input controller 61, the various processing units 62 to 67, the frame memory 68, the various controlling units 69 and 71 and the CPU 75. Through the data bus 76, transfer of digital image data, communication and control for setting the photographing condition, and the like, are carried out.

Now, a process controlled by the CPU 75 when an image is taken by the digital camera 1 having the above-described configuration will be described with reference to the flow chart shown in FIG. 5. Basic operations carried out by the AF processing unit 62, the AE/AWB processing unit 63, and the like, are as described above, and therefore, explanation of the operations at the respective units is omitted in the following description unless necessary. Here, the flow of the process controlled by the CPU 75 is mainly described.

As the process starts in step P1, as shown in FIG. 5, first, whether the operation mode is the photographing mode or the playback mode is determined in step P2. If it is determined that the operation mode specified by the operation mode switch 11D is the playback mode, the process proceeds to step P12 to carry out the playback operation. As described above, in the playback operation, the image file is read from the external recording medium 70, and the image represented by the image file is outputted by the LCD monitor 18. When the playback operation is completed, the process proceeds to step P11.

On the other hand, if it is determined in step P2 that the operation mode is the photographing mode, the process proceeds to step P3, where the type of the photographing mode is determined.

If the photographing mode specified by the photographing mode switch 11S is an automatic face detection photographing mode, a face detection process is carried out in step P4. If the photographing mode is a normal mode, the process proceeds to a normal photographing operation without carrying out the face detection process.

Figure 6:
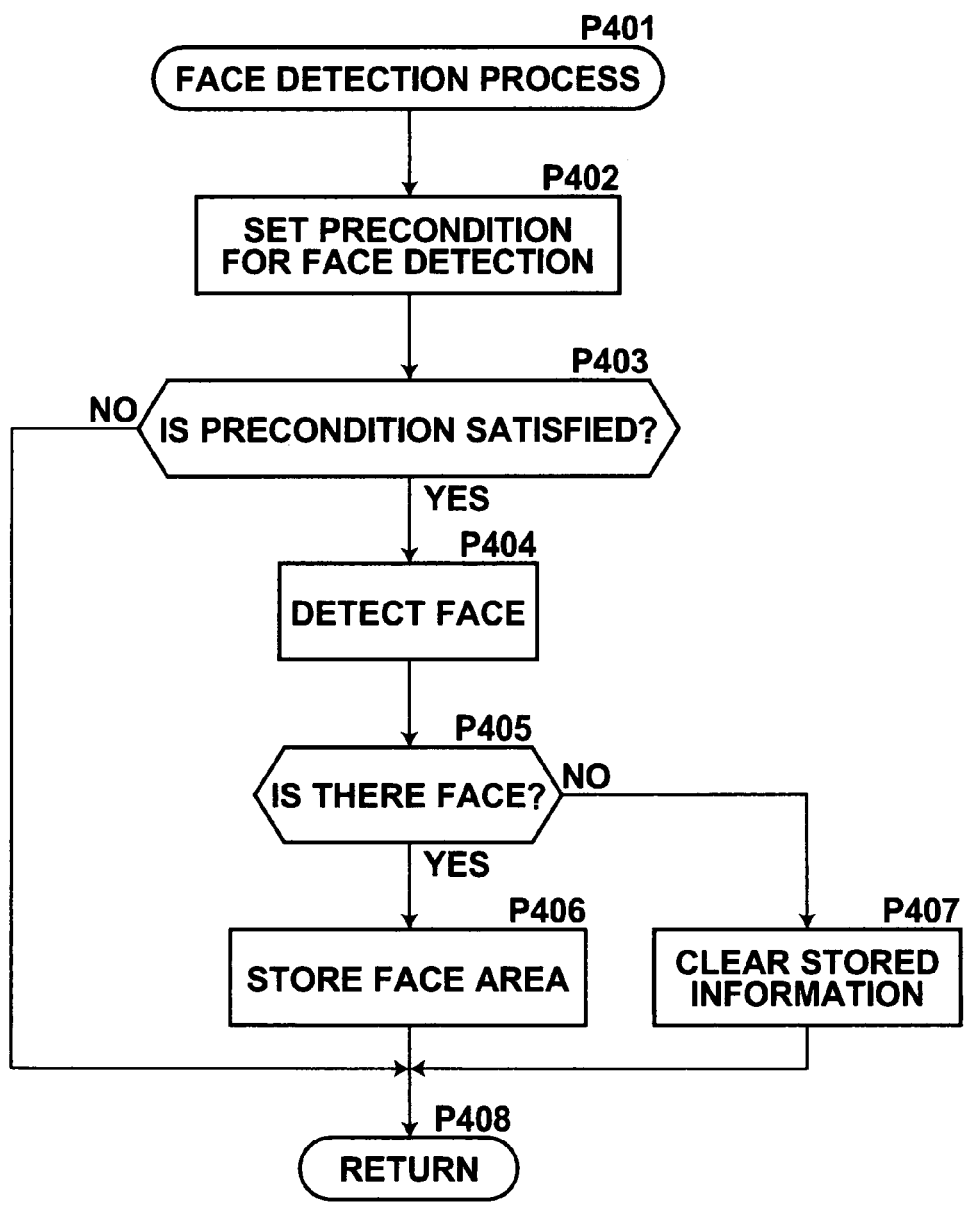
FIG. 6 is a flow chart illustrating steps of a face detection process.

Here, the face detection is described with reference to the block diagram in FIG. 4 illustrating details of the face detection processing unit, and the flow chart in FIG. 6 illustrating details of the face detection process.

In this face detection process, the face detection is carried out only when the image acquired by photographing deserves the face detection, so that frequency of the face detection operations is reduced, thereby reducing load on the CPU and power consumption accompanying image processing in the face detection. The precondition storing unit 84 stores the plurality of preconditions for making efficient use of the face detection by the detecting unit 82.

The face detection process starts in step P401, and proceeds to step P402. In step P402, one of the candidate preconditions J1, J2, ... stored in the precondition storing unit 84 is selected and set to be used for the determination by the determining unit 83.

In order to set the precondition, one (the precondition J1 in this example) of the precondition J1, J2, ... stored in the precondition storing unit 84 is specified for use in the above-described determination through user's manipulation of the menu switching button 12, which forms a part of the selecting unit 85. Then, the selecting unit 85 selects the precondition J1 from the storing unit 84, and inputs the precondition J1 to the determining unit 83. In this example, the selected precondition J1 is "a backlit state", i.e., "a backlit state where an amount of light received in the peripheral area of the imaging surface 58a is larger than an amount of light received in the central area of the imaging surface 58a". The amount of light received in the central area of the imaging surface is an average amount of received light per unit area in an area containing the weighted center of the light receiving area on the imaging surface, which is not more than 30% of the entire area of the imaging surface. Further, the amount of light received in the peripheral area of the imaging surface is an average amount of received light per unit area in an area other than the central area of the imaging surface, which is less than 70% of the entire area of the imaging surface.

Therefore, the precondition J1 refers to a state where the average amount of received light per unit area in the area other than the central area of the imaging surface 58a, which is less than 70% of the entire area of the imaging surface, is larger than the average amount of received light per unit area in the area containing the weighted center on the imaging surface 58a of the CCD 58, which is not more than 30% of the entire area of the imaging surface 58a.

Then, the process proceeds to step 403, where the determining unit 83, to which the precondition J1 has been inputted, determines whether or not the photographing condition of the digital camera 1 satisfies the precondition J1. The determining unit obtains, via the CPU 75, the average amount of received light per unit area in the central area and the average amount of received light per unit area in the peripheral area of the imaging surface 58a of the CCD 58, and compares these amounts with each other to determine whether or not the precondition J1 is satisfied.

The controlling unit 86 exerts control such that when the determining unit 83 has determined that the photographing condition of the digital camera 1 satisfies the precondition J1, the detecting unit 82 carried out the face detection, and when the determining unit 83 has determined that the photographing condition of the digital camera 1 does not satisfy the precondition J1, the detecting unit 82 does not carry out the face detection.

Namely, if it is determined that the photographing condition satisfies the precondition J1, the process proceeds to step P404 to start the face detection process, and if it is determined that the photographing condition does not satisfy the precondition J1, the process proceeds to step P408 to return (to the main process).

Now, the face detection process, which is carried out when the photographing condition satisfies the precondition J1 and starts in step P404, will be described below.

When the face detection is carried out in step 404, the live view taken through the imaging lens 20 is inputted to the detecting unit 82, and the discrimination information Hj for discriminating a face is inputted from the discrimination information storing unit 81 to the detecting unit 82. Then, the detecting unit 82 detects an image representing a face from the live view based on the discrimination information Hj. The discrimination information Hj includes information of, for example, positional relationships between components of a face such as eye, nose, mouth and ear, or contours of a face. The detecting unit 82 detects a face using image processing for extracting the positional relationships and/or the contours from the live view. The face detection process may use known conventional techniques described, for example, in Japanese Unexamined Patent Publication Nos. 2004-320286 and 2005-242640.

Then, the process proceeds to step 405, and if a face is detected, the process proceeds to step 406, where face area information, which represents the area within which the face image is focused on the imaging surface 58a, is stored in a face area storing unit 87. On the other hand, if no face is detected, the process proceeds to step 407, where the face area information already stored in the face area storing unit 87 is deleted.

Namely, if a face is detected, the detecting unit 82 causes the face area storing unit 87 to store the face area information that represents the area within which the face image, detected by the detecting unit 82, is focused on the imaging surface 58a. On the other hand, if no face is detected, the detecting unit 82 deletes the face area information already stored in the face area storing unit 87.

Then, in any case, the process proceeds to step P408 to return (to the main process).

The process returns (to the main process) in step P408 and proceeds to step P5, where whether or not the shutter button 19 is fully pressed or half-pressed is determined.

If it is determined in step P5 that the shutter button 19 is fully pressed or half-pressed, then the process proceeds to the focusing process in step P6, where focus adjustment is carried out. On the other hand, if the shutter button 19 is not pressed, i.e., the shutter button 19 is not fully pressed nor half-pressed, then the process proceeds to step P4 to carry out the face detection process again.

In step P6, the AF processing unit 62 is instructed to carry out the AF operation, and the focusing process is carries out. The focusing process will be described in detail later.

As the focusing process has been carried out, then, in step P7, the AE/AWB processing unit 63 is instructed to determine the exposure, and the exposure is determined.

As the exposure has been determined, then, in step P8, whether the shutter button 19 is fully pressed, half pressed or not pressed is determined.

If the shutter button 19 is not pressed, then, the process returns to step P4, where the face detection process is carried out again.

If it is determined that the shutter button 19 is half-pressed, then, the exposure adjustment operation is carried out again in step P7.

If it is determined that shutter button 19 is fully pressed, then, the process proceeds to step P9, where actual photographing of the subject is carried out.

As the actual photographing has been carried out in step P9, the image taken by the actual photographing is displayed on the LCD monitor 18, and the image is recorded in the external recording medium 70 in step P10. Subsequently, in step P11, whether or not the lens cover 21 has been closed and the power has been turned off is determined. If the power is not turned off, the process returns to step P2 and operations for photographing the next subject begin. If the power has been turned off, then, the process proceeds to step P13, where the entire process ends.

According to the invention as described above, the face detection is not carried out when it is unlikely that the face detection will be efficiently used in the subsequent operations. In this manner, unnecessary face detection operations can be reduced, thereby reducing the power consumption by the face detection operations.

Figure 7:
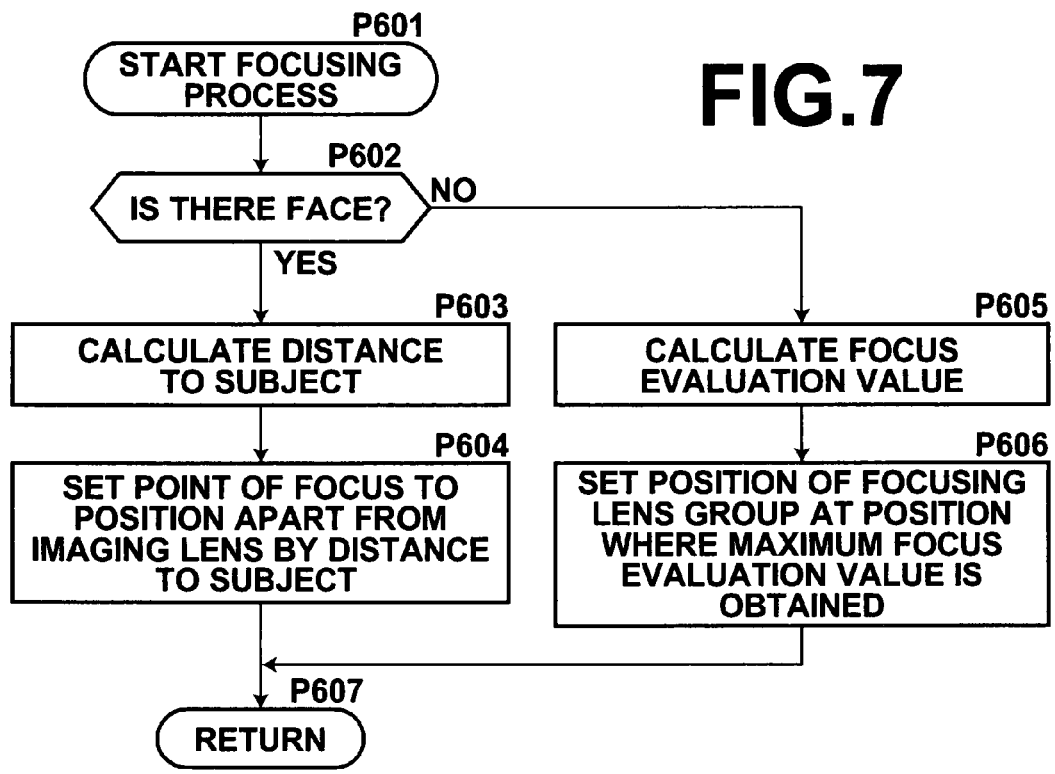
FIG. 7 is a flowchart illustrating steps of a focusing process.

Now, the focusing process carried out by the AF processing unit 62 in step P6 will be described with reference to FIG. 7 illustrating details of the process in step P6.

As the focusing process starts in step P601, the process proceeds to step P602, where whether there is a face or not is determined. In this step, if a face has been detected in step P404 described above, it is determined that there is a face. On the other hand, if no face has been detected in step P404, it is determined that there is no face.

If it is determined in step P602 that there is a face, the process proceeds to an operation carried out in steps P603 to P604, where a distance to the subject is calculated and the subject is focused. Details of this operation are as follows.

In step P603, the AF processing unit 62 calculates a distance from the imaging lens to the face, which is the detected subject. The distance to the subject is calculated using the image data representing the preliminary images stored in the frame memory 68 when the shutter button is half-pressed or fully pressed. For example, the number of pixels on the CCD 58 corresponding to a feature quantity (such as the size of the face or the distance between the eyes) of the subject in the image is found, and the distance to the subject is calculated based on the number of pixels. It should be noted that such calculation of the distance to the subject is described in detail in Japanese Unexamined Patent Publication No. 2004-320286, for example, and the method described therein is applicable to this embodiment.

Then, in step P604, the position of the focusing lens group 20a is set so that the point of focus of the imaging lens 20 is set at the position that is apart from the imaging lens 20 by the distance equal to the distance to the subject. Namely, the focusing lens driving unit 51 moves the focusing lens group 20a to the above-described position, based on the focusing lens driving amount data outputted from the AF processing unit 62, and holds the focusing lens group 20a at that position.

As the focusing process has been completed as described above, the process proceeds to step P607 to return to step P7.

On the other hand, if it is determined in step P602 that there is no face, then, the process proceeds to an operation in steps P605 to P606, where a focus evaluation value distribution is found based on focus evaluation values obtained at different points of focus, and the focusing lens group 20a is moved to the point corresponding to the maximum focus evaluation value in the focus evaluation value distribution is employed. This operation is described in detail below with reference to FIG. 8.

Figure 8:
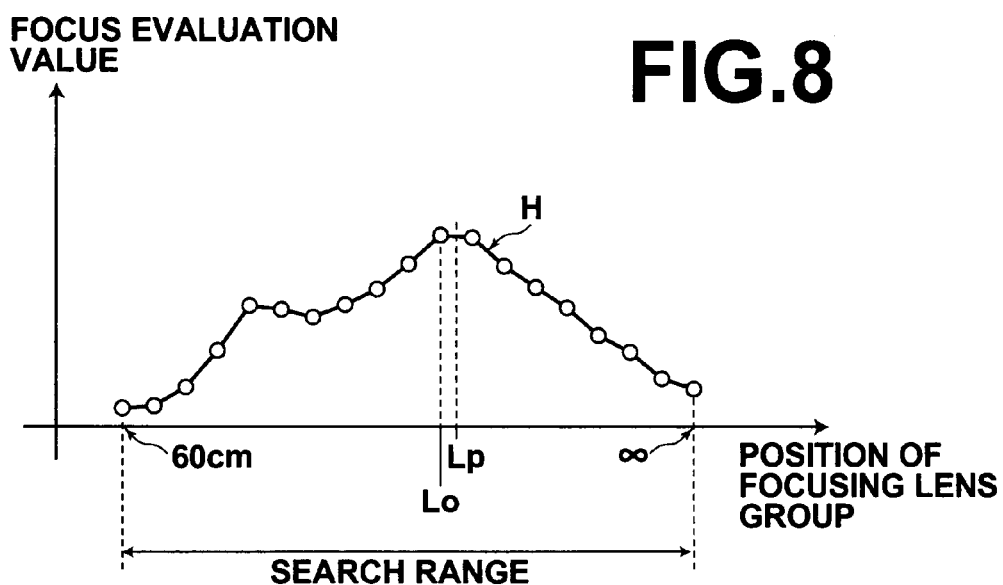
FIG. 8 is a graph showing a focus evaluation value curve.

In step P605, first, the focusing lens driving unit 51 moves the focusing lens group 20a throughout the operation range thereof along the optical axis based on driving data outputted from the AF processing unit 62. In this embodiment, the focus operation range (search range) is a range where an object at a distance ranging, for example, from 60 cm at the nearest side to the infinity at the farthest side is focused. While the focusing lens group 20a is moved in this manner, the above-described preliminary photographing is carried out for a plurality of times and the image data of taken images is stored in the frame memory 68. This preliminary photographing is carried out while the focusing lens group 20a is moved in one direction. The AF processing unit 62 obtains the focus evaluation value that corresponds to the contrast of the image taken at each position. To obtain the focus evaluation value, the AF processing unit 62 filters the image data representing each preliminary image to find high-frequency components thereof, and an integral value of absolute values of the high-frequency components is used as the focus evaluation value of the image. FIG. 8 shows one example of a focus evaluation value distribution H of focus evaluation values, which are obtained successively while the point of focus of the imaging lens 20 is moved in one direction (i.e., the focusing lens group 20a is moved in one direction), as described above, plotted with respect to corresponding positions of the focusing lens group 20a ("60 cm", "1 m", and "∞" in FIG. 8 are points of focus corresponding to the positions of the focusing lens group).

Then, in step P606, a point of focus that is suitable for the actual photographing is determined. In this step, the AF processing unit 62 finds, using interpolation, for example, a position Lp of the focusing lens group 20a, as shown in FIG. 8, where the maximum focus evaluation value is obtained while the focusing lens group 20a is moved. The position Lp is used as the position of the focusing lens group 20a set for the actual photographing.

It should be noted that, besides determining the position Lp of the focusing lens group 20a using interpolation or the like, a position of the focusing lens group 20a corresponding to the maximum focus evaluation value among the actually obtained focus evaluation values (the position Lo in the example shown in FIG. 8) may be employed, or if there are two positions having the maximum value, one which is nearer than the other may be employed.

Further, the focusing lens group 20a may not necessarily be moved throughout the operation range thereof. For example, if a "hill-climbing focusing operation" as shown in Japanese Unexamined Patent Publication No. 2004-048446 is employed, the focusing lens group 20a may only be moved within a part of the operation range thereof. In this case, speeding up of the focusing operation can be achieved.

As the focusing process has been completed as described above, the process proceeds to step P607 to return to the exposure adjustment operation in step P7.

In the above description, when the digital camera is in the above-described automatic face detection photographing mode, the process proceeds to the focusing process and the exposure adjustment operation when it is determined in step 5 that the shutter is half-pressed or fully pressed. However, the present invention is not limited to this embodiment. For example, this step 5 may be omitted, and an automatic face detection AF photographing mode may be employed, where after the face detection process has been completed, the AF processing unit 62 detects the point of focus based on preliminary images, which are automatically acquired without the user pressing of the shutter button to the half-pressed state.

It should be noted that, besides the precondition of the backlit state, preconditions described below may be applied as the preconditions stored in the precondition storing unit 84 and used for the determination. Further, if a combination of two or more preconditions is used for the determination, the determining unit may determine that the photographing condition of the digital camera 1 satisfies the precondition if it satisfies all of the preconditions used for the determination, or if it satisfies one of the preconditions used for the determination. Examples of the preconditions for efficiently using the result of the face detection are as follows.

As the precondition, "the angle of view of the imaging lens is fixed" may be employed. In this case, information about the movement of the zooming lens group 20b forming the imaging lens 20 is inputted to the determining unit 83 via the CPU 75. The determining unit 83 determines that the precondition is satisfied if the zooming lens group 20b is judged, based on the movement information, to have not moved for the past three seconds.

Further, as the precondition, "the photographing apparatus is stationary" may be employed. In this case, acceleration information that represents an acceleration measured by an acceleration sensor 89 provided in the digital camera 1 is inputted to the determining unit 83 via the CPU 75. The determining unit 83 determines that the precondition is satisfied if a state where an image would not blur due to changes in position of the digital camera 1 is continuing for at least three seconds, which is judged based on the acceleration information.

Furthermore, as the precondition, "an amount of light received on the imaging surface 58a does not fluctuate" may be employed. In this case, light amount information, which is obtained by the CCD 58, representing a total amount of light received in a central area (which is 30% of the entire area) of the imaging surface of the CCD 58 is sequentially inputted to the determining unit 83 via the CPU 75. The determining unit 83 determines that the precondition is satisfied if a state where a fluctuation of the amount of received light represented by the inputted light amount information is not more than 5% is continuing for at least three seconds.

Moreover, as the precondition, "two or more maximum values are contained in a focus evaluation value distribution based on focus evaluation values of images taken while the point of focus of the imaging lens is moved" may be employed. In this case, focus evaluation value information representing the focus evaluation value distribution obtained by the AF processing unit 62 is inputted to the determining unit 83 via the CPU 75. The determining unit 83 determines that the precondition is satisfied when it is found that the focus evaluation value distribution represented by the inputted focus evaluation value information contains two or more maximum values.

The focus evaluation value distribution H shown in FIG. 8 is one example of the focus evaluation value distribution containing two or more maximum values (peaks).

The focus evaluation value is a value representing the contrast of the image taken through the imaging lens. The focus evaluation value distribution is a distribution of the focus evaluation values, plotted with respect to the corresponding points of focus, of the images taken while the point of focus of the imaging lens 20 is moved in one direction, i.e., the focusing lens group 20a is moved in one direction.

Further, when the automatic focusing unit carries out the continuous AF, where the point of focus of the imaging lens 20 is always set at the position of the subject, a condition "the automatic focusing unit maintains the point of focus of the imaging lens unchanged" may be employed as the precondition.

Namely, this precondition refers to a state where the automatic focusing unit carries out the continuous AF and the automatic focusing unit maintains the point of focus of the imaging lens 20 unchanged.

Specifically, if a state where an integral value of values of the focusing lens driving amount data for moving the focusing lens group 20a along the optical axis, which is outputted from the AF processing unit 62 of the automatic focusing unit, stays unchanged is continuing for at least three seconds, the determining unit 83 determines that the precondition is satisfied.

The continuous AF is an automatic focusing method in which the point of focus is always adjusted to focus on the subject based on the live view of the subject, which is taken without user's manipulation of the shutter button.

In a case where the photographing apparatus includes a subject movement detecting unit 66 (see FIG. 3) that detects movement of the subject and outputs the result of the detection, "the output from the subject movement detecting unit indicates that the position of the subject stays unchanged" may be employed as the precondition. As the subject movement detecting unit 66, for example, an infrared sensor, which is commonly used for security purpose, can be employed.

In addition, as the precondition, "values representing colors of taken images stay unchanged", "the photographing mode of the photographing apparatus is set to a face detection mode, a person photographing mode, a self-timer photographing mode or a self-photographing mode", "an amount of remaining energy accumulated in a battery for driving the automatic focusing unit is not more than a preset threshold value" or "an amount of remaining energy accumulated in a battery for driving the automatic focusing unit is not less than a preset threshold value" may be employed.

It should be noted that the face detection mode, the person photographing mode, the self-timer photographing mode and the self-photographing mode may or may not have mutually exclusive relationship. For example, the face detection mode and the person photographing mode may or may not be simultaneously set and operated.

Further, for example, the person photographing mode and the self-timer photographing mode may or may not be simultaneously set and operated.

It should be noted that the face detection mode is not a photographing mode for the face detection (for detecting a face). A state where the face detection mode is set refers, for example, to a state where an operation or manipulation for enabling the face detection has been carried out.

In addition, the person photographing mode refers to a mode that is suitable for photographing a person as the subject.

Further, in a case where a face has been detected through the face detection by the detecting unit 82 and a suitable condition for photographing the face is continuing, and therefore, there is no need of further face detection by the detecting unit 82, the detecting unit 82 may be controlled not to carry out the detection. In this case, as the precondition, "an amount of light received on the imaging surface is changing", "the automatic focusing unit is changing the point of focus of the imaging lens", "values representing colors of taken images are changing", "the output from the subject movement detecting unit indicates that the subject is moving", or the like, may be employed. In this manner, unnecessary face detection operations can be reduced.

Although the present invention has been applied to a digital still camera that takes and records still images in the above-described embodiment, the invention is applicable to any photographing apparatuses such as video cameras that take and record motion images, or monitoring cameras that take and record motion images or still images at a predetermined place for a long time.

In the photographing method and device of the present invention, determination is made as to whether or not the photographing condition satisfies a precondition for detecting an image representing a face from images taken through the imaging lens, i.e., a precondition for efficiently using the result of the face detection in the subsequent operations. if it is determined that the photographing condition satisfies the precondition, the face detection is carried out, and if it is determined that the photographing condition does not satisfy the precondition, the face detection is not carried out. Therefore, if it is unlikely that the result of the face detection will be efficiently used in the subsequent operations, the face detection is not carried out. This reduces the frequency of unnecessary face detection operations, thereby reducing the power consumption by the face detection operations.

Further, in a case where the precondition "a backlit state where an amount of light received in a peripheral area of the imaging surface is larger than an amount of light received in a central area of the imaging surface" is used, execution of unnecessary face detection operation in a so-called frontlit state, where a face can be successfully photographed without carrying out the face detection, can be avoided. Thus, frequency of unnecessary face detection operations can be reduced with higher certainty, thereby reducing the power consumption by the face detection operations with higher certainty.

Furthermore, in a case where the precondition "the angle of view of the imaging lens is fixed" is used, and the imaging lens has a function to change the focal length (to change the zooming magnification), useless face detection operations can be prevented while the zooming magnification of the imaging lens is changed and it is expected that a desired image cannot be obtained. Thus, frequency of unnecessary face detection operations can be reduced with higher certainty, thereby reducing the power consumption by the face detection operations with higher certainty.

Moreover, in a case where the precondition "the photographing apparatus is stationary" is used, useless face detection operations can be prevented when it is expected that a desired image cannot be obtained due to, for example, hand movement. Thus, frequency of unnecessary face detection operations can be reduced with higher certainty, thereby reducing the power consumption by the face detection operations with higher certainty.

In addition, in a case where the precondition "an amount of light received on the imaging surface stays unchanged" is used, useless face detection operations can be prevented when it is expected that a desired image cannot be obtained since, for example, the image focused on the imaging surface through the imaging lens is changing. Thus, frequency of unnecessary face detection operations can be reduced with higher certainty, thereby reducing the power consumption by the face detection operations with higher certainty.

Further, in a case where the photographing apparatus includes the subject movement detecting means for detecting movement of the subject and outputting the result of the detection, and the precondition is that the output from the subject movement detecting means indicates that the position of the subject stays unchanged, the power consumption of the photographing apparatus can further be reduced since the amount of information processing, and therefore the power consumption, by the subject movement detecting means is lower than those by the detecting means for detecting an image representing a face.

Moreover, in a case where the precondition "an amount of light received on the imaging surface is changing", "the automatic focusing means is changing the point of focus of the imaging lens", "values representing colors of the taken images are changing" or "the output from the subject movement detecting means indicates that the position of the subject is changing" is used, the face detectioning means is controlled not to carry out the detection when there is no deed of carrying out the face detection since a condition suitable for photographing the face is continuing. Thus, frequency of unnecessary face detection operations can be reduced, thereby reducing the power consumption by the face detection operations with higher certainty.

What is claimed is:

1. A photographing apparatus for photographing an image of a subject focused on an imaging surface through an imaging lens, the photographing apparatus comprising:
a discrimination information storing means for storing discrimination information for discriminating a face;
a detecting means for detecting, based on the discrimination information, an image representing a face from images taken through the imaging lens;
a precondition storing means for storing preconditions for efficiently using the result of the detection by the detecting means;
a determining means for determining whether or not a photographing condition of the photographing apparatus satisfies the precondition; and
a controlling means for exerting control such that, when it is determined a photographing mode is an automatic face detecting mode, the controlling means exerting control such that, if it is determined by the determining means that the photographing condition of the photographing apparatus satisfies the precondition, the detecting means carries out the detection, and if it is determined that the photographing condition of the photographing apparatus does not satisfy the precondition, the detecting means does not carry out the detection, and
wherein the precondition comprises a backlit state where an amount of light received in a peripheral area of the imaging surface is larger than an amount of light received in a central area of the imaging surface and in the case that the preconditions are satisfied and face detection is executed by the detecting means, a focusing process that utilizes the results of the face detection is executed, and in the case that the preconditions are not satisfied and the face detection is not executed by the detecting means, a focusing process that utilizes focus evaluation values obtained at a plurality of different points of focus is executed.

2. The photographing apparatus as claimed in claim 1, wherein the precondition storing means stores different candidate preconditions being candidates for the precondition, and the photographing apparatus further comprises a selecting means for selecting at least one of the candidate preconditions to be used in the determination.

3. The photographing apparatus as claimed in claim 1, wherein the precondition comprises an amount of light received in the central area of the imaging surface is an average amount of received light per unit area, in an area containing a weighted center of a light receiving area on the imaging surface, is not more than 30% of an entire area of the imaging surface, and an amount of light received in the peripheral area of the imaging surface is an average amount of received light per unit area, in an area other than the central area of the imaging surface, is less than 70% of the entire area of the imaging surface.

4. The photographing apparatus as claimed in claim 1, wherein the amount of light received in the peripheral area of the imaging surface in the backlit state is an average amount of received light per unit area in an area other than the central area of the imaging device, which is less than the entire area of the imaging surface.

5. A photographing method for photographing an image of a subject focused on an imaging surface through an imaging lens, the method comprising:

determining whether or not a photographing condition at the time to carry out the photographing satisfies a precondition for efficiently using a result of detection of an image representing a face from images taken through the imaging lens; and controlling such that, when it is determined a photographing mode is an automatic face detecting mode, controlling such that if it is determined that the photographing condition at the time to carry out the photographing satisfies the precondition, the detection is carried out, and if it is determined that the photographing condition at the time to carry out the photographing does not satisfy the precondition, the detection is not carried out, and wherein the precondition comprises a backlit state where an amount of light received in a peripheral area of the imaging surface is larger than an amount of light received in a central area of the imaging surface and in the case that the preconditions are satisfied and face detection is executed, a focusing process that utilizes the results of the face detection is executed, and in the case that the preconditions are not satisfied and the face detection is not executed, a focusing process that utilizes focus evaluation values obtained at a plurality of different points of focus is executed.

* * * * *